(12) United States Patent
Paas et al.

(10) Patent No.: US 8,539,553 B2
(45) Date of Patent: Sep. 17, 2013

(54) SYSTEM AND METHOD FOR MANAGING DELIVERY OF INTERNET CONTENT

(75) Inventors: Julian Paas, Mississauga (CA); David Castell, Waterloo (CA); Peter Hantzakos, North York (CA); Piotr Calak, Mississauga (CA); Mihal Lazaridis, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1511 days.

(21) Appl. No.: 12/058,011

(22) Filed: Mar. 28, 2008

(65) Prior Publication Data

US 2009/0013387 A1    Jan. 8, 2009

Related U.S. Application Data

(60) Provisional application No. 60/909,181, filed on Mar. 30, 2007.

(51) Int. Cl.
*G06F 17/30* (2006.01)

(52) U.S. Cl.
USPC .......... 726/4; 726/17; 713/25; 713/153; 713/155; 713/168

(58) Field of Classification Search
USPC .......... 713/2, 153, 155, 168; 726/4, 17; 709/203; 715/749
See application file for complete search history.

(56) References Cited

U.S. PATENT DOCUMENTS

| | | | |
|---|---|---|---|
| 6,311,058 B1 | 10/2001 | Wecker et al. | |
| 6,742,127 B2 * | 5/2004 | Fox et al. | 726/10 |
| 7,941,497 B2 * | 5/2011 | Schmidt | 709/207 |
| 8,112,720 B2 * | 2/2012 | Curtis | 715/811 |
| 2005/0262530 A1 * | 11/2005 | Ruetschi et al. | 725/35 |
| 2007/0061331 A1 | 3/2007 | Ramer et al. | |
| 2007/0168429 A1 | 7/2007 | Apfel et al. | |
| 2007/0173237 A1 * | 7/2007 | Roundtree | 455/414.1 |

FOREIGN PATENT DOCUMENTS

| | | |
|---|---|---|
| KR | 20010029170 A1 | 6/2001 |
| WO | 02076077 A1 | 9/2002 |

OTHER PUBLICATIONS

Intermec Technologies Corporation, "User's Manual—700 Series Monochrome Mobile Computer," 2003; Chapter 2: Pocket PC 2002 (pp. 13-88).

Yunos et al., "Wireless Advertising's Challenges and Opportunities," Computer, vol. 23, Issue 5, May 2003; pp. 30-37.

Palm, Inc., "Your Palm® Treo™ 700P Smartphone User Guide," Version 1.0, 2006; PN: 406-10803-00; 286 pages.

(Continued)

*Primary Examiner* — Eleni Shiferaw
*Assistant Examiner* — Paul Callahan
(74) *Attorney, Agent, or Firm* — Fitch, Even, Tabin & Flannery LLP

(57) ABSTRACT

Disclosed are a system and method for managing delivery of pushed web content to communication devices. In an embodiment, the method comprises: uniquely identifying a communication device to which the pushed web content is to be delivered; establishing a pushed web content service linking the pushed web content to the communication device; receiving a pushed web content service request; and permitting delivery of content to the communication device via the pushed web content service based on verification of the identity of a trusted pushed web content provider. The method may further comprise uniquely identifying the pushed web content provider with an assignable unique pushed web content identification.

15 Claims, 9 Drawing Sheets

(56) References Cited

OTHER PUBLICATIONS

Arase et al., "Nine-Button Web Browsing System for Cellular Phone Users," Innovations in Information Technology, Nov. 2006; 5 pages.

International Search Report from PCT/CA2008/000600; Jul. 24, 2008, 5 pages.
Korean Office Action dated Feb. 22, 2011 from related Application No. 10-2009-7022806; 10 pages, including translation.

* cited by examiner

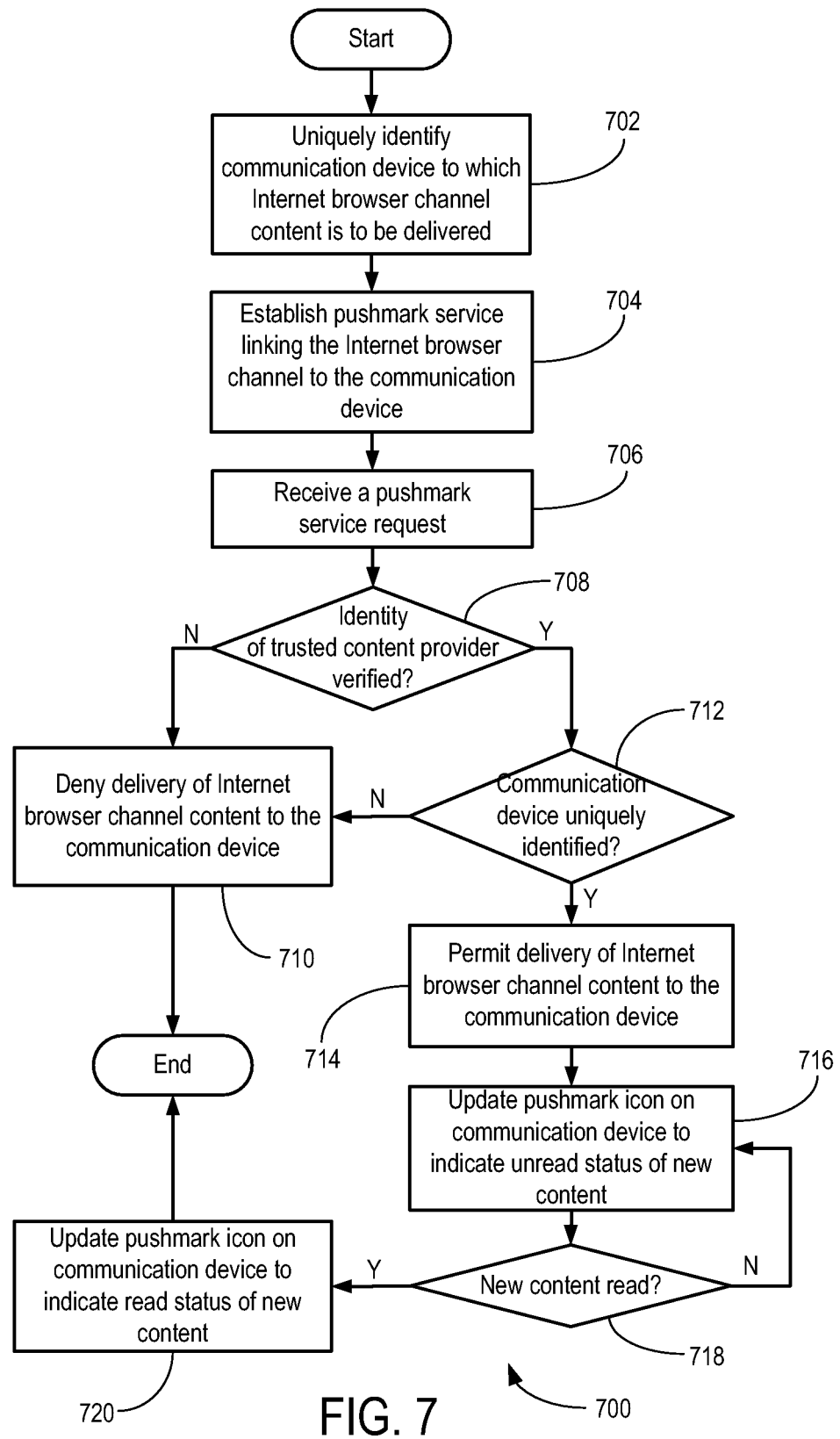

SYSTEM AND METHOD FOR MANAGING DELIVERY OF INTERNET CONTENT

RELATED APPLICATION INFORMATION

This application claims the benefit of U.S. Provisional Patent Application No. 60/909,181 entitled "System and Method for Managing Delivery of Internet Content," filed Mar. 30, 2007, the disclosure of which is incorporated herein by reference in its entirety.

FIELD OF THE INVENTION

The present disclosure relates generally to systems and methods for managing delivery of Internet content, and more particularly, to systems and methods for managing delivery of Internet content to mobile communication devices.

BACKGROUND

Recent advances in wireless communication technologies and increased wireless network bandwidth capacities have led to the development and availability of wireless Internet access with browsing capabilities on handheld mobile communication devices. Another relatively recent development is the increasing popularity of Internet browser channels which may be used to deliver frequently updated web content such as news, sports, stock prices, etc. Delivery of Internet browser channel content to handheld mobile communication devices may present some unique challenges due to potential security issues, and limited infrastructure resources such as available bandwidth.

BRIEF DESCRIPTION OF THE DRAWINGS

In the figures which illustrate exemplary embodiments:

FIG. 7 is a flowchart of an illustrative method in accordance with an embodiment.

DETAILED DESCRIPTION

As noted above, the present disclosure relates to a system and method for delivery of Internet browser channel content, and more particularly, to systems and methods for managing delivery of Internet content to mobile communication devices.

Figure 1:
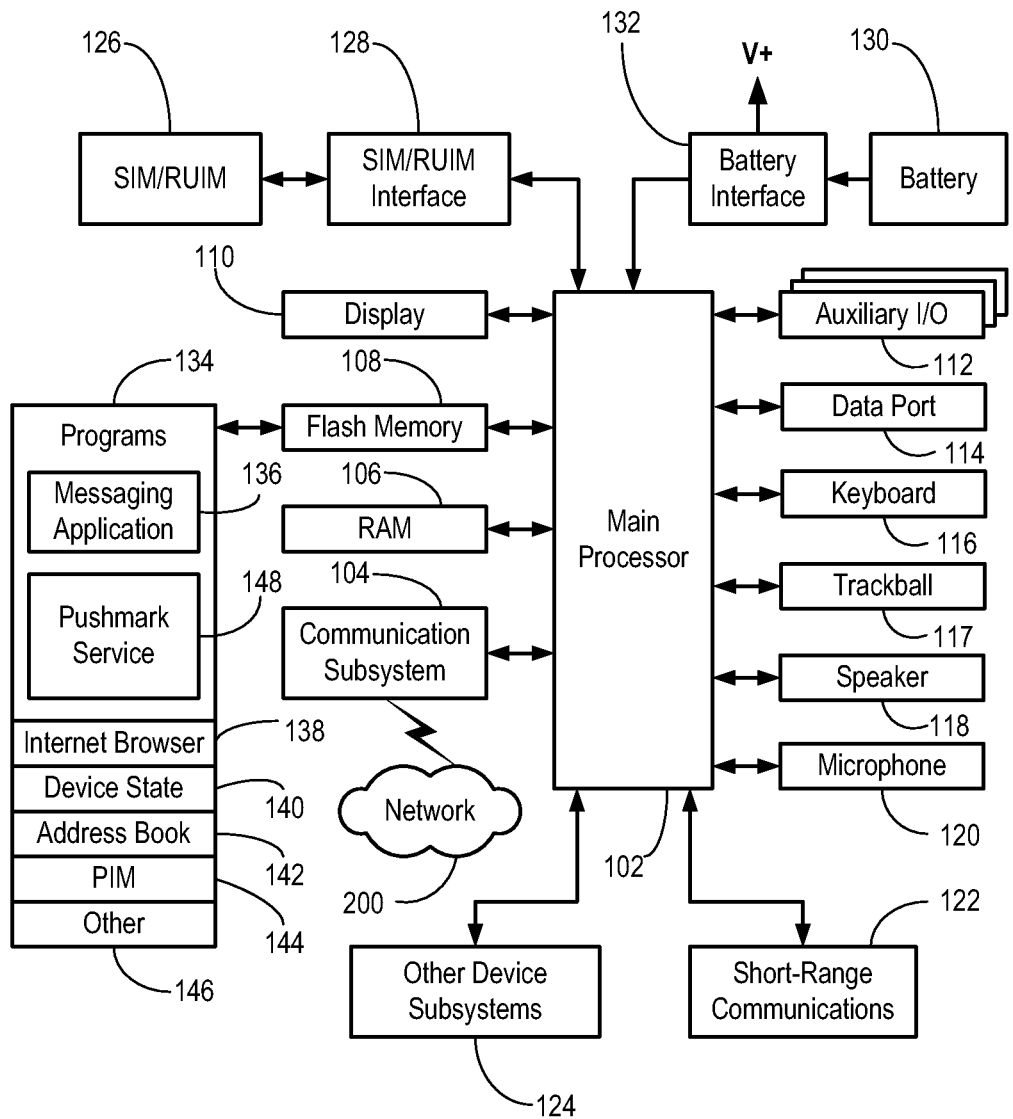
FIG. 1 is a schematic block diagram of various components that may be found in a mobile communication device.

In an illustrative embodiment, the principles of the present disclosure may be practiced with a mobile communication device in a wireless operating environment. Shown in FIG. 1 is a schematic block diagram of an illustrative mobile communication device 100. The communication device 100 may comprise a number of components, including a main processor 102 which controls the overall operation of communication device 100. Communication functions, including data and voice communications, may be performed through a communication subsystem 104. The communication subsystem 104 may receive messages from and sends messages to a wireless network 200.

The main processor 102 may also interact with additional subsystems such as a random access memory (RAM) 106, a flash memory 108, a display 110, an auxiliary input/output (I/O) subsystem 112, a data port 114, a keyboard 116, a trackball 117, a speaker 118, a microphone 120, short-range communications 122 and other device subsystems 124. In some embodiments, the keyboard 116 may comprise a virtual keyboard or a physical keyboard or both. In some embodiments, the display 110 may comprise a touchscreen display.

Some of the subsystems of the communication device 100 may perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list. The trackball 117 may be used for various navigation functions, such as navigating through a graphical user interface (GUI) menu displayed on display 110. The trackball 117 may also be configured with a secondary actuation feature, such as allowing a user to depress the trackball, to allow selection of a highlighted item.

Operating system software used by the main processor 102 is typically stored in a persistent store such as flash memory 108. Those skilled in the art will appreciate that the operating system, specific device applications, or parts thereof, may be temporarily loaded into a volatile store such as the RAM 106.

The communication device 100 may send and receive communication signals over the wireless network 200 after required network registration or activation procedures have been completed. Network access may be associated with a subscriber or user of the communication device 100.

The communication device 100 may be a battery-powered device and may include a battery interface 132 for receiving one or more rechargeable batteries 130. In some embodiments, the battery 130 may be a smart battery with an embedded microprocessor. The battery interface 132 is coupled to a regulator (not shown), which assists the battery 130 in providing power V+ to the communication device 100. In some embodiments, the communication device 100 may be solar powered or otherwise powered with or without use of a battery.

The main processor 102, in addition to its operating system functions, enables execution of software applications 134 on the communication device 100. The subset of software applications 134 that control basic device operations, including data and voice communication applications, will normally be installed on the communication device 100 during its manufacture.

In an embodiment, the communication device 100 may include an electronic serial number (ESN) or product identification number (PIN) that uniquely identifies the communication device 100. This ESN or PIN may be factory assigned during assembly of the communication device 100, and may be stored in non-volatile memory (such as flash memory 108) on communication device 100.

The software applications 134 may include a messaging application 136. The messaging application 136 can be any suitable software program that allows a subscriber or user of the communication device 100 to send and receive wireless text communications. Various alternatives exist for the messaging application 136 as is well known to those skilled in the art. Messages that have been sent or received by the user are typically stored in local storage such as flash memory 108 of the communication device 100, or in some other suitable storage element in the communication device 100. In an alternative embodiment, some of the sent and received messages may be stored remotely from the device 100 such as in a data store of an associated host system that the communication device 100 communicates with.

Another program that may be executed by the communication device 100 is an Internet browser module 138 that may be configured to provide wireless access to the Internet. The communication device 100 may further include a device state module 140, an address book module 142, a Personal Information Manager (PIM) module 144, and various other modules 146. Additional software applications may also be loaded onto the communication device 100 through at least one of the wireless network 200, the auxiliary I/O subsystem 112, the data port 114, the short-range communications subsystem 122, or other device subsystem 124.

To identify a user, the communications device 100 may use a SIM/RUIM/USIM card 126 (i.e. Subscriber Identity Module or a Removable User Identity Module or a Universal Subscriber Identity Module, etc.), which is inserted into a SIM/RUIM/USIM interface 128, to communicate with a network. The SIM/RUIM/USIM card 126 is one type of a conventional "smart card" that can be used to identify a user of the communications device 100 and to personalize the communications device 100, among other things. Without the SIM/RUIM/USIM card 126, the communications device 100 may not be fully operational for communication with the wireless network 200, in some embodiments. By inserting the SIM/RUIM/USIM card 126 into the SIM/RUIM/USIM interface 128, a user can access subscribed services. Such subscribed services may include, for example, web browsing and messaging such as email, voice mail, Short Message Service (SMS), and Multimedia Messaging Services (MMS).

In an embodiment, the communication device 100 may further include a pushmark or pushed web content service module 148 that may be configured to set up pushmark service functions on device 100 in accordance with various embodiments. For more clarity, the term "pushmark service" as used in the present disclosure generally refers to a pushed web content service for pushing web content to the device 100. The pushed web content may include, for example, one or more of a URL, label, text, graphics, audio, or video content. A more detailed description of pushmark service module 148 will follow further below.

Figure 2:
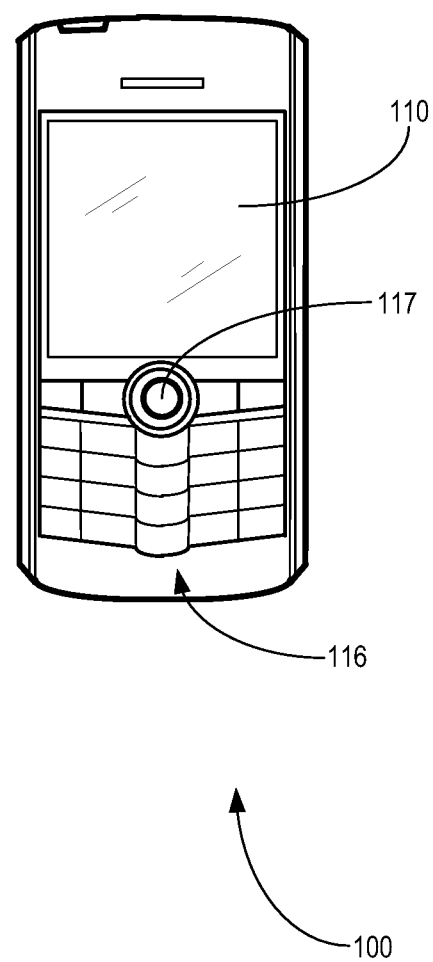
FIG. 2 is an illustrative example of a mobile communication device that may provide an operating environment.

Now referring to FIG. 2, shown is an illustrative front view of an exemplary type of mobile communication device 100 that may provide a suitable operating environment. In this particular example, mobile communication device 100 comprises a handheld smart phone; however, the scope of the present disclosure is not limited to a specific type of device. As shown, the communication device 100 may include a display 110, a keyboard 116, and other input or navigation means such as a trackball 117. The display 110 may be configured to display various screens allowing the user of device 100 to view screen outputs from the Internet browser module 138, and to provide an input in response to a prompt or query displayed on display 110.

Figure 3:
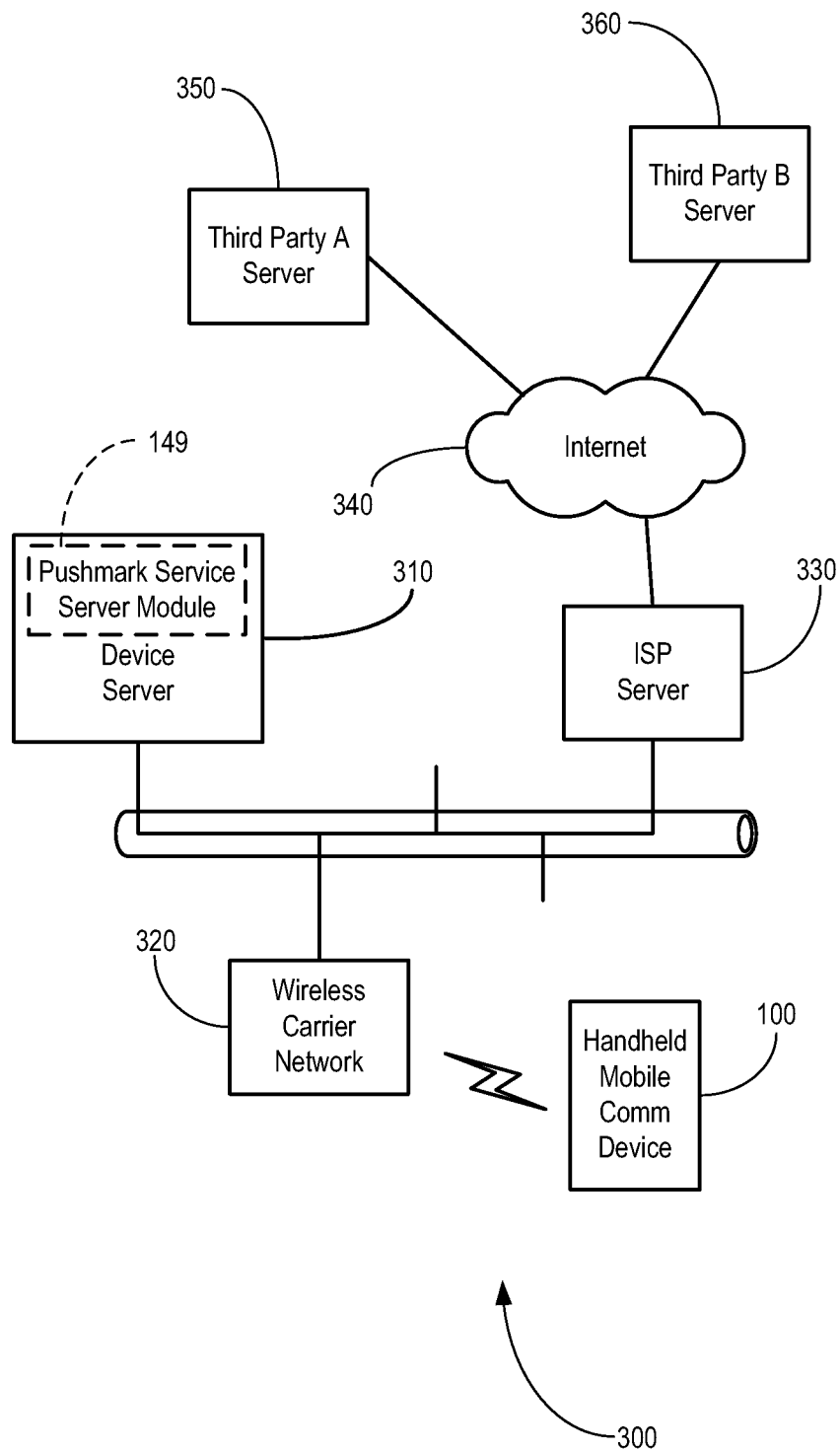
FIG. 3 is a block diagram of an illustrative network in which various embodiments of the invention may be practiced.

Now referring to FIG. 3, shown is a schematic block diagram of an illustrative network environment 300 in which various embodiments of the invention may be practiced. As shown, network environment 300 may include a device server 310 operatively connected to the handheld mobile communication device 100 via a wireless carrier network 320. Device server 310 may host a pushmark service server module 149 which may be configured to interact with pushmark service module 148 on the handheld mobile communication device 100 in order to establish a pushmark service, as will be discussed in more detail below.

An Internet Service Provider (ISP) server 330 may also be provided in the network environment 300 such that a user of device 100 may access the Internet 340 from the device 100. Third-party content provider servers 350 and 360 may be connected to the Internet 340 and may provide wireless Internet access to the device 100 via the device server 310, wireless network 320, and Internet browser application 138.

In an embodiment, the third-party servers 350, 360 may be configured to host Internet browser channels delivering targeted web content such as news, weather, sports, stock prices, etc. to communication device 100. Depending on the type of content, the Internet browser channels may be configured to deliver updates on a frequent basis. However, as noted earlier, due to potential security concerns and infrastructure resource limitations, it may be desirable to carefully manage delivery of Internet browser channel content to device 100. At the same time, when a user wishes to set up and access an Internet browser channel on the communication device 100, the setup process should be simple and convenient to perform.

Figure 4:
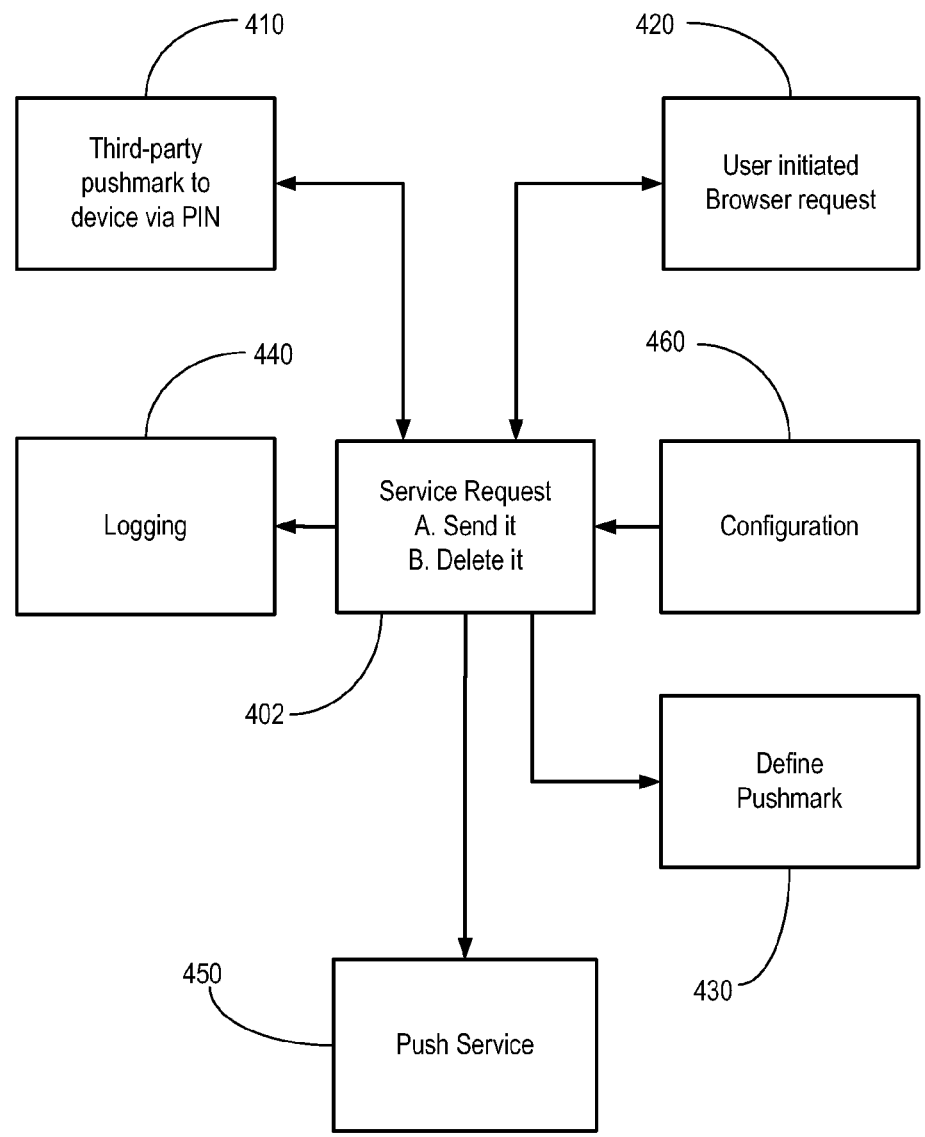
FIG. 4 is a block diagram of an illustrative process for setting up pushmark icons for delivery of Internet browser channel content.

Now referring to FIG. 4, shown is a block diagram of an illustrative process for setting up a pushmark service for an Internet browser channel. As shown, there may be multiple modes of setting up a pushmark service: In a first mode, shown at block 410, a third-party may send a request to pushmark service server module 149 to establish a pushmark service with communication device 100 based on a unique ESN or PIN for the communication device 100. Such an ESN or PIN number may be stored, for example, in non-volatile flash memory 108 of device 100. In an alternative second mode, as shown at block 420, a user of communication device 100 may send a request to pushmark service server module 149 to establish the pushmark service by opening an Internet webpage URL, which may then trigger the process of sending an Internet browser channel pushmark to the communication device 100. These alternative modes are described in more detail below.

Still referring to FIG. 4, upon receiving a pushmark service request at block 402, pushmark service server module 149 may be configured to send a service request to set up a pushmark, or to delete it. At block 402, in an embodiment, a pushmark service may be set up using a suitable pushmark descriptor file, which will be described in more detail further below. For example, the descriptor file may indicate whether or not a third-party is a trusted third-party having prior permission to send pushmarks to the communication device 100. If the service request is user initiated, a decision to send a service request may be determined on whether or not the Internet browser channel a user wishes to subscribe to is a trusted third party having pre-approved permission to deliver Internet browser channel content to communication devices 100 through device server 310. In an alternative embodiment, rather than relying on a descriptor file, all of the parameters that would normally be provided in the descriptor file may instead be supplied via an HTTP request from a third-party content provider. As will be explained in more detail further below, this allows the third party to manage subscriptions and scheduling for its Internet browser channel, and then to make a request to the pushmark service server module 149 to deliver content to the handheld mobile communication device 100.

Still referring to FIG. 4, if a pushmark service request is sent at block 402, an appropriate pushmark may be defined at block 430, and an Internet browser channel pushmark service may be established as shown at block 450. Any pushmark service request sent to block 402 may be logged at block 440, and the log entries detailing accesses to the pushmark service may be stored for later review and reporting if necessary. As well, configuration information at block 460 may be used as an input to block 402. This configuration block 460 may provide flexibility in setting up the pushmark service within an infrastructure provider's internal network configuration.

In an embodiment, in order to control access to the pushmark service, each third-party content provider may be assigned one or more unique Internet browser channel IDs, so that one content provider is not able to overwrite or interfere with the Internet browser channel(s) being pushed by other content providers. For example, in an embodiment, each content provider may be assigned a unique pushmark ID by the infrastructure provider, and any content delivery request sent by each third-party content provider must be accompanied by the assigned unique pushmark ID. In order to ensure that only authorized content providers are able to access the pushmark service, a network authentication process may also be implemented. A network authentication model may be used to authenticate content providers. For example, this network authentication model may involve opening a limited number of the infrastructure providers' ports to content providers. Each content provider may then be permitted access to a specific port number or numbers on a pushmark service server (e.g. device server 310 with pushmark service server module 149). Additionally, content providers may be asked to provide the IP addresses of the systems that will be making the pushmark service requests through the infrastructure providers network. The IP addresses may then be matched to each content provider. If an Internet browser channel is being requested by any system that does not match the content providers' specific characteristics, (i.e. unique IP addresses, assigned port numbers, etc), the pushmark request will be rejected.

As noted above, in an embodiment, a pushmark service request may be made entirely via parameters encoded in an HTTP request from a third-party content provider. For example, the following are some illustrative commands that may be executed by the pushmark service server module 149 when setting up a pushmark for an Internet browser channel:

PMCmd (mandatory): The pushmark command to be executed. The acceptable values may be: "add" or "delete" for a command;

PIN (mandatory): The communication device to which the pushmark is to be delivered;

PMURL (mandatory if PMCmd=add): The URL to be launched when the browser channel pushmark icon is clicked.

PMName (optional): The display name of the Push Mark application that will appear for the browser channel on the user's device. If this is not set, the PMURL will be displayed instead.

PMunreadIconURL (optional): The URL of the pushmark to be used for the unread state of the browser channel. If this is not set, a default generic browser channel pushmark will appear on the user's device.

PMreadIconURL (optional): The URL of the pushmark icon to be used for the read state of the browser channel. If this is not set, the PMunreadIconURL will be used.

PMsuccessURL (optional): The URL of the page to be redirected to, if the pushmark request succeeds. If this variable is not specified, the user will not be redirected to a success page, but a return code will be passed back.

PMfailURL (optional): The URL of the page to be redirected to, if the pushmark request fails. If this variable is not specified, the user will not be redirected to a failure page, but a return code will be passed back.

In an alternative embodiment, a simple HTML form for making the pushmark service request may be set up on the third-party content provider's website, for example. In this case, the pushmark service request may be defined via parameters encoded in an HTTP request to the pushmark service server module 149. For load balancing purposes, the pushmark server name may be an alias that the DNS server may distribute to multiple pushmark service servers. For example, multiple pushmark service servers may be part of the infrastructure provider's network and may be physically located wherever the infrastructure provider deems it necessary, (e.g. corporate headquarters, local regional offices, etc). In order to better serve multiple geographies, push servers may be regionally located and locally administered by the infrastructure provider, but may also be administered remotely if necessary or required.

In an embodiment, the third-party content provider may be responsible for developing and managing the subscription mechanism allowing users to opt in or opt out of their Internet browser channel services. The third-party content provider may also be responsible for the capture of the ESN or PIN from device 100 necessary to push updated Internet browser channel content to specific communication devices 100. The third-party content provider may also be responsible for developing and maintaining the system which manages when push channels will be sent out to users based on each user's preference.

Upon setting up a pushmark on communication device 100, the third-party content provider may be provided with privileges to push Internet browser channel content directly to device 100 as updates become available. However, rather than allowing a third-party content provider to directly deliver content to a handheld mobile communication device 100, the pushmark service server module 149 running on device server 310 may be employed as a trusted agent to perform any Internet browser channel content updates on behalf of the third-party content providers. As will be appreciated, this safe delivery mode may further restrict the ability of third-party content providers to send Internet browser channel content directly to users of communication device 100, but may also enhance security and control over usage of infrastructure resources.

Figure 5A:
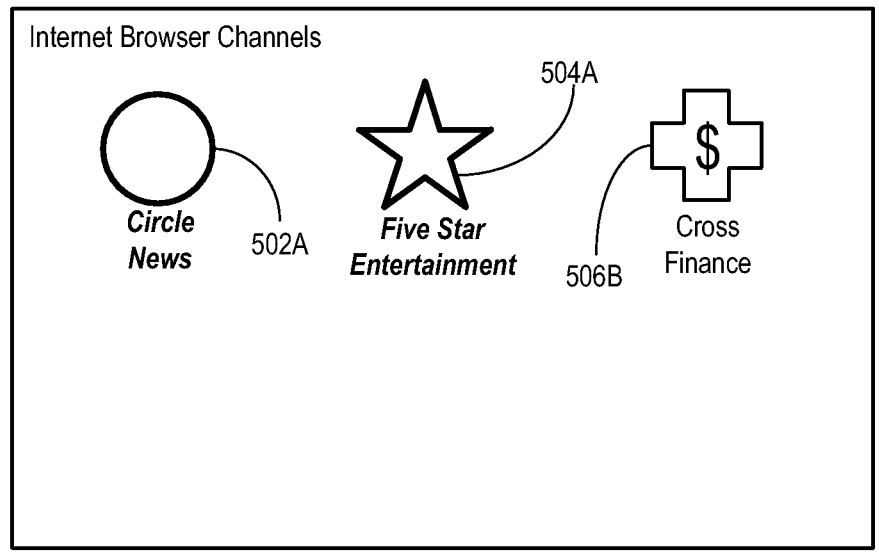
FIGS. 5A to 5F are exemplary user interface screens showing illustrative pushmark icons for accessing Internet browser channel content.

Now referring to FIG. 5A, shown is an illustrative user interface screen 400 that may be configured to display Internet browser channels as "pushmark icons". In an embodiment, pushmark service module 148 may be configured to store in non-volatile memory (e.g. flash memory 108) a unique identifier for each Internet browser channel pushmark. The unique identifier may be associated with a specific website URL, such that when a user selects one of these pushmark icons, the corresponding Internet browser channel and content is automatically accessed (e.g. via Internet browser module 138).

Still referring to FIG. 5A, in order to readily distinguish a particular Internet browser channel in the user interface, pushmark service module 148 may receive third-party generated pushmarks (e.g. from third-party content providers 350, 360) having unique graphic features identifying the associated Internet browser channel as being from a particular content provider. The pushmark may further incorporate graphic features indicative of the Internet browser channel content. In this illustrative example, Internet browser channels such as "Circle News", "Five Star Entertainment" and "Cross Finance" have corresponding pushmarks 502A, 504A, 506B available to be selected from an Internet browser channel screen 500A. As shown, these pushmark names may be assigned to each pushmark such that the names appear below the corresponding graphic symbol. In other embodiments, the pushmark names or other text associated with the pushmark icons may be appear elsewhere in the screen.

Figure 5B:
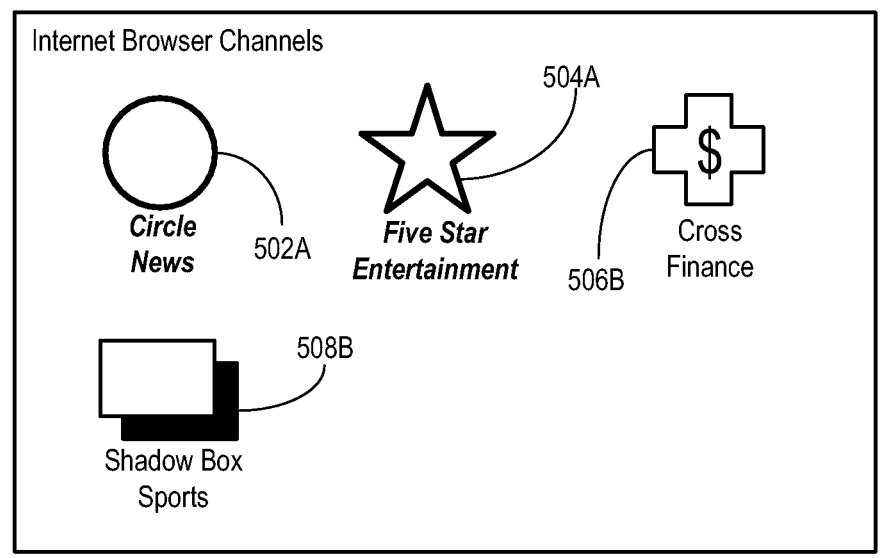

Referring to FIG. 5B, when a new Internet browser channel (e.g. "Shadow Box Sports") is approved and added to the list of Internet browser channels received by communication device 100, a corresponding new pushmark 508B may be added to the Internet browser channels screen 500B for selection by the user of communication device 100.

In an embodiment, multiple pushmark icons may be associated with an Internet browser channel to indicate different states, such as a "read" state and an "unread" state. For example, as shown in FIGS. 5A and 5B, if the latest update to an Internet browser channel has not yet been read by the user of device 100, then the corresponding pushmarks (e.g. see "Circle News" and "Five Star Entertainment") may indicate an "unread" state by displaying bold highlighted pushmark icons with italicized text below. It will be appreciated that this is an illustrative example only, and virtually any visually distinctive feature may be used to indicate an "unread" state. Moreover, an audible indicator or a haptic indicator may be used to further indicate an "unread" state.

Figure 5C:
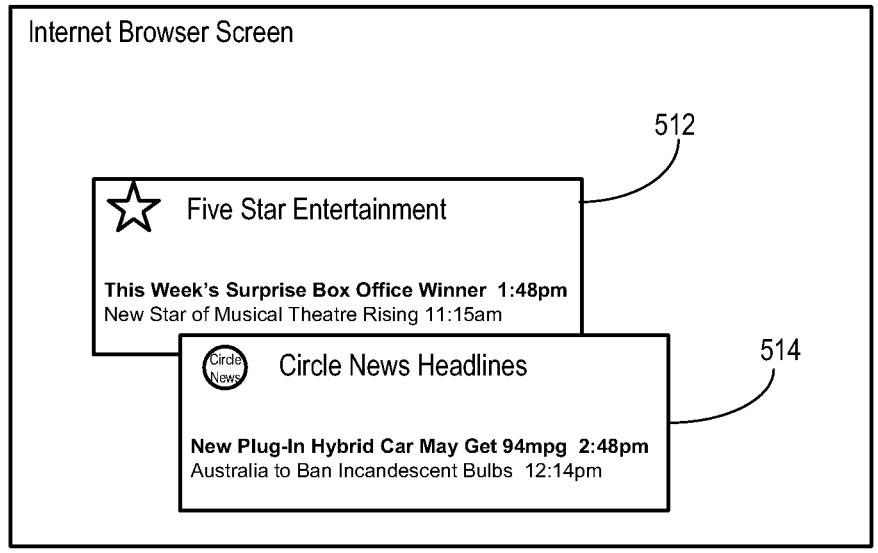

As shown by way of example in FIG. 5C, when the user of communication device 100 accesses these Internet browser channels by selecting (e.g., by touching or clicking on) these pushmark icons, the Internet browser channel windows may open in windows 512, 514. When a user selects the newly updated items in each Internet browser channel, the corresponding pushmarks for "Circle News" and "Five Star Entertainment" may then show a "read" state by displaying the pushmark icons and text normally, as shown illustratively in FIG. 5D. Subsequently, when another update is pushed to the device 100 for any one of these Internet browser channels, then the highlighted version of the pushmark icon indicating the "unread" state (e.g. as in FIGS. 5A and 5B) may be displayed once again. By including different versions of pushmark icons indicating both "read" and "unread" states, a third-party content provider's Internet browser channel may be able to receive more frequent attention from the user. This may be beneficial if, for example, the pushmarks are associated with ad revenues.

Figure 5D:
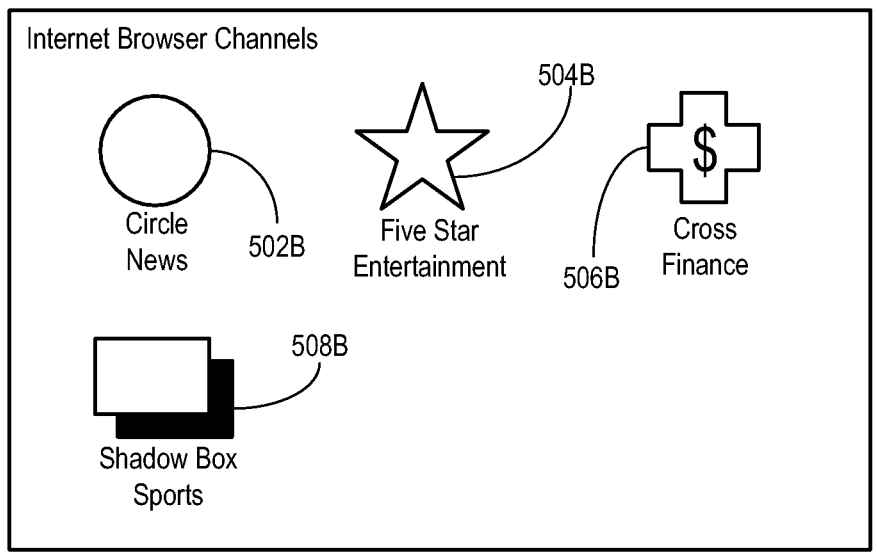
Figure 5E:
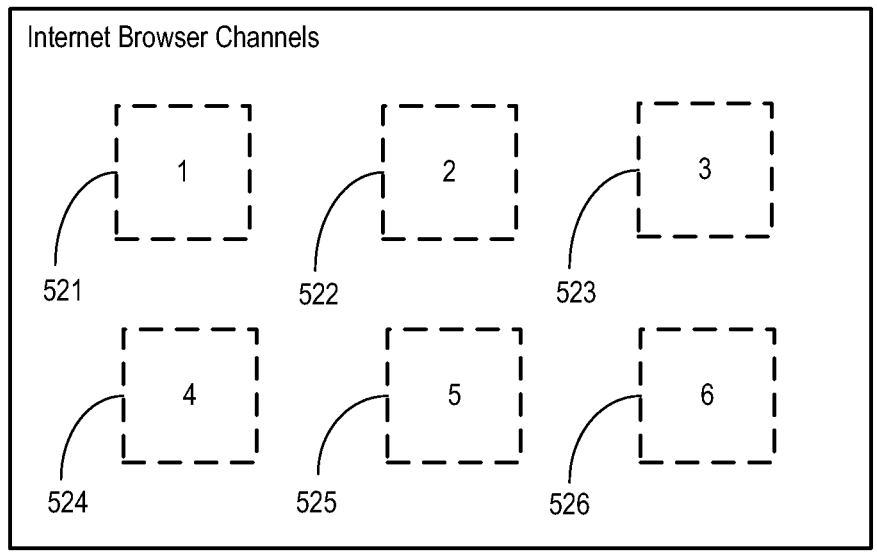

Now referring to FIG. 5E, when displaying the Internet browser channels for selection, it may be desirable to show particular pushmark icons in specific locations on the user interface 500E. For example, as shown in FIG. 5E, the user interface 500E for displaying Internet browser channels may be provided with a plurality of defined pushmark positions 521-526 for positioning the pushmark icons. For example, referring back to FIG. 5D, pushmark icons 502B, 504B, 506B, and 508B may be assigned to and positioned at pushmark positions 521, 522, 523 and 524, respectively.

In an embodiment, to maintain the position of the pushmark icons 502B-508B when a new pushmark for an Internet browser channel is added, pushmark service server module 149 may be adapted to anchor each of the pushmark icons 502B-508B to a particular pushmark position. For example, as shown in FIG. 5D, pushmarks 502B, 504B, 506B, and 508B may be anchored to pushmark positions 521, 522, 523 and 524. If a new pushmark is added, the new pushmark icon may be positioned at pushmark position 525. The next pushmark icon added may be positioned at pushmark position 526.

Alternatively, when a new pushmark icon is added, the user may be provided with a navigation control (e.g. trackball 117) in order to position the pushmark icon in any desired pushmark position 521-526 in the user interface 500E. As will be appreciated, the consistent positioning of pushmark icons 502B, 504B, 506B, and 508B in the user interface 500E may facilitate easier user access to the Internet browser channels.

Now referring to FIG. 5E, in another embodiment, the pushmark icons 502B, 504B, 506B, and 508B may be placed in another user interface (e.g. user interface 500F) which may combine the Internet browser channel pushmarks 502B, 504B, 506B, and 508B with other types of pushmarks. For example, as shown in FIG. 5F, the user interface 500F may comprise a main desktop user interface in which pushmark icons 502B, 504B, 506B, and 508B are positioned at specific locations in the user interface 500F.

Figure 5F:
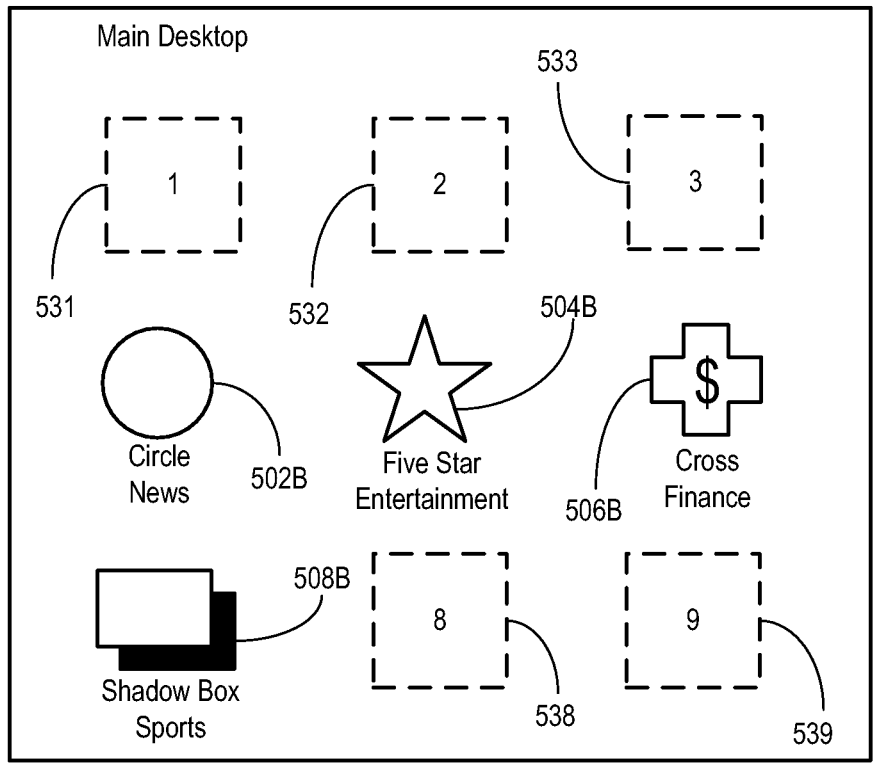

In the illustrative example shown in FIG. 5F, the pushmark icons 502B, 504B, 506B, and 508B may be positioned starting from the second row of icon positions 531-539 defined in the user interface 500F. In an embodiment, the first row (positions 531, 532, and 533) may be reserved such that icons corresponding to priority applications may be positioned in the first row of user interface 500F. For example, the priority icons located in the first row may be a Message List icon, a Calendar icon, and an Address Book icon (not shown). By reserving the first row for such priority icons, the user may add various pushmarks 502B, 504B, 506B, and 508B to the main desktop user interface 500F without displacing priority icons from their prominent positions in the user interface 500F.

As will be appreciated, this may be extended such that all priority icons may be placed before pushmark icons. For example, if an icon position matrix provides four rows and six columns, the first and second rows may be reserved to allow for a total of up to twelve reserved positions for placing priority icons. Other pushmarks may then be assigned to pushmark positions starting on the third row.

More generally, instead of reserving icon positions by rows, specific icon positions may be reserved for placing priority icons. For example, the user may wish to reserve the first one or two columns of icon positions on the left side of the icon position matrix for priority icons. As another example, the user may wish to reserve specific icon positions, such as a sub-matrix of two columns by two rows in the upper left corner of the icon position matrix. It will be appreciated that virtually any other arrangement for reserving icon positions may be used.

Alternatively, as another example, specific positions, such as the first row (i.e., the top row) of positions or the first column (i.e., the left-most column) of positions in the icon position matrix may be reserved for pushmark icons to allow for a more prominent positioning of and attracting more attention to the pushmark icons.

Figure 6:
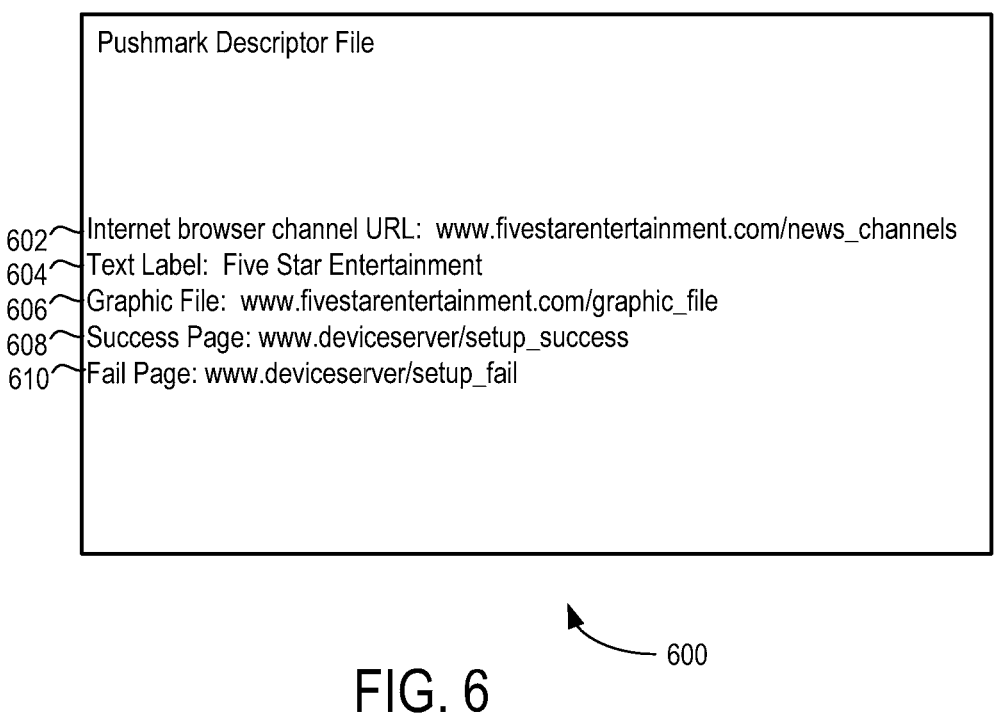
FIG. 6 is an illustrative descriptor file for defining a pushmark icon for an Internet browser channel.

Now referring to FIG. 6, shown is an illustrative pushmark descriptor file 600 that may be used by pushmark service module 148 for defining a pushmark for an Internet browser channel, and for authorizing subsequent updates. In an embodiment, the descriptor file may be stored on device server 310, and include an Internet browser channel URL 602, a text label 604 for the Internet browser channel, a graphic file URL 606 linking to a graphic file containing the pushmark, and various other URLs such as a success message page 608 and a fail message page 610.

In another embodiment, when a user requests a subscription to an Internet browser channel service at a third-party content provider's website, the pushmark service server module 149 may reference the pushmark descriptor file 600 on device server 310. The pushmark definitions, as defined by the descriptor files may then be used to set up a pushmark service for an Internet browser channel as described earlier. In the absence of suitably defined parameters, a third-party content provider may not set up a pushmark on communication device 100. This may be used to control delivery access to trusted third-party content providers only.

In another embodiment, rather than relying on descriptor files, a request to establish a pushmark service may be made via a third-party HTTP request that contains all of the necessary parameters that would otherwise have been provided by the descriptor file. This allows third-party content providers to push Internet browser channel content to the devices 100 via a controlled pushmark service, and allows the infrastructure provider to restrict or limit access to the service in order to ensure quality of service for the entire infrastructure. However, it still allows an authorized content provider to have full control over the definition of the content, and the way in which the pushmark icon may be presented (e.g. different versions of pushmark icons to indicate different "read" and "unread" states).

Functionally this also means that the request and push of content for these Internet browser channels no longer needs to be initiated by the user from communication device 100. As long as the device user trusts the content provider with their PIN number, and the content provider is approved by the infrastructure provider, the push can be initiated by the third-party content provider. This also means that the Internet browser channel may be updated dynamically. That is, once verified, the third-party content provider can update the Internet browser channel with a different label, pushmark icon, or URL link whenever they want. The browser channel is no longer static.

Now referring to FIG. 7, shown is a flowchart of an illustrative method 700 in accordance with an embodiment. As shown method 700 begins and at block 702 uniquely identifies a communication device to which Internet browser channel content is to be delivered. As noted earlier, a communication device 100 may be uniquely identified by its ESN or PIN.

At block 704, method 700 establishes a pushmark service linking the Internet browser channel to the communication device 100. This may include setting up a pushmark icon for the Internet browser channel on the communication device 100.

Next, at block 706, method 700 may receive a pushmark service request. For example, the pushmark service request may be made by a third party via an HTTP request with encoded pushmark service parameters.

At decision block 708, method 700 determines whether the identity of a trusted Internet browser channel content provider can be verified. This verification may involve receipt of a unique pushmark ID assigned to the content provider which has been received together with the pushmark service request. If no, method 700 proceeds to block 710, where the request to set up a pushmark service or to deliver content to the communication device is denied. Method 700 then ends.

If yes at decision block 708, method 700 proceeds to decision block 712, where method 700 may determine if the communication device to which content is to be delivered is uniquely identified. If no, method 700 proceeds to block 710, where the request to set up a pushmark service or to deliver content to the communication device is denied. Method 700 then ends.

At decision block 712, if yes, method 700 proceeds to block 714, where delivery of the Internet browser channel content to the communication device is permitted. At block 716, the pushmark icon set up on the communication device may be updated to indicate the "unread" status of new content that has been delivered. At decision block 718, if new content remains unread, the pushmark icon indicating the unread status continues to be displayed. However, if the new content is read, method 700 proceeds to block 720 where the pushmark icon is updated to indicate that all content has been read. Method 700 then ends.

Thus, in an aspect of the invention, there is provided a method of managing delivery of pushed web content to a communication device, the method comprising: uniquely identifying the communication device to which the pushed web content is to be delivered; establishing a pushed web content service linking the pushed web content to the communication device; receiving a pushed web content service request; and permitting delivery of content to the communication device via the pushed web content service based on verification of an identity of a trusted pushed web content provider.

In an embodiment, the method further comprises uniquely identifying the pushed web content provider with an assignable unique pushed web content identification.

In another embodiment, the act of uniquely identifying the communication device comprises using at least one of an electronic serial number (ESN) or a product identification number (PIN) provided on the communication device.

In another embodiment, the method further comprises storing one or more parameters for a pushed web content service request in a descriptor file.

In another embodiment, the method further comprises encoding one or more parameters for a pushed web content service request in an HTTP request.

In another embodiment, the method further comprises defining a pushed web content icon associated with the pushed web content service.

In another embodiment, the method further comprises providing one or more alternative pushed web content icons to indicate one or more alternative states.

In another embodiment, the method further comprises providing a first pushed web content icon indicating a read state, and providing a second pushed web content icon indicating an unread state.

In another aspect, there is provided a system for managing delivery of pushed web content to a communication device, the system comprising a pushed web content service module adapted to: uniquely identify the communication device to which the pushed web content is to be delivered; establish a pushed web content service linking the pushed web content to the communication device; receive a pushed web content service request; and permit delivery of content to the communication device via the pushed web content service based on verification of the identity of a trusted pushed web content provider.

In an embodiment, the pushed web content service module is further adapted to uniquely identify the pushed web content provider with an assignable unique pushed web content identification.

In another embodiment, the pushed web content service module is further adapted to uniquely identify the communication device using at least one of an electronic serial number (ESN) or a product identification number (PIN) provided on the communication device.

In another embodiment, the pushed web content service module is further adapted to store one or more parameters for a pushed web content service request in a descriptor file.

In another embodiment, the pushed web content service module is further adapted to encode one or more parameters for a pushed web content service request in an HTTP request.

In another embodiment, the pushed web content service module is further adapted to define a pushed web content icon associated with the pushed web content service.

In another embodiment, the pushed web content service module is further adapted to provide one or more alternative pushed web content icons to indicate one or more alternative states.

In another embodiment, the pushed web content service module is further adapted to provide a first pushed web content icon indicating a read state, and provide a second pushed web content icon indicating an unread state.

In another embodiment, the communication device comprises a smart phone, and the pushed web content comprises one or more of a URL, label, text, graphics, audio, or video content, and the system further comprises a display for displaying the pushed web content upon selection of the pushed web content icon.

In another aspect, there is provided a data processor readable medium containing data processor code that when loaded onto a device adapts the device to manage delivery of pushed web content to a communication device, comprising: code for uniquely identifying the communication device to which the pushed web content is to be delivered; code for establishing a pushed web content icon service linking the pushed web content to the communication device; code for receiving a pushed web content service request; and code for permitting delivery of content to the communication device via the pushed web content icon service based on verification of the identity of a trusted pushed web content provider.

In an embodiment, the data processor readable medium further comprises code for uniquely identifying the pushed web content provider with an assignable unique pushed web content identification.

In another embodiment, the data processor readable medium further comprises code for uniquely identifying the communication device using at least one of an electronic serial number (ESN) or a product identification number (PIN) provided on the communication device.

In an embodiment, the data processor readable medium further comprises code for defining a pushed web content icon associated with the pushed web content service.

In another aspect, there is provided a method of displaying icons in a user interface, the method comprising: defining a plurality of icon positions in a user interface; and reserving at least one priority icon position for positioning at least one priority icon.

In an embodiment, the method further comprises: anchoring a pushed web content service icon to a particular icon position in the user interface; and displaying the pushed web content icon in the particular icon position in the user interface as long as the pushed web content icon remains anchored thereto.

In another aspect, there is provided a device for displaying icons in a user interface, the device having a display, a memory and a main processor adapted to: define a plurality of icon positions in a user interface; and reserve at least one priority icon position for positioning at least one priority icon.

In an embodiment, the device further comprises a pushed web content service module adapted to: anchor a pushed web content icon to a particular icon position in the user interface; and display the pushed web content icon in the particular icon position in the user interface as long as the pushed web content icon remains anchored thereto.

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

While illustrative embodiments have been described above, it will be appreciated that various changes and modifications may be made. More generally, the scope of the invention is defined by the following claims.

What is claimed is:

1. A method for delivering web content to a communication device, the method comprising:
communicating a subscription request for an internet browser channel service to a server, the server being in communication with a trusted third-party web content provider having pre-approved permission to push web content to the communication device through the internet browser channel, wherein the communicating comprises:
uniquely identifying the trusted third-party web content provider with an assignable unique internet browser channel identification;
uniquely identifying the communication device using at least one of an electronic serial number (ESN) or a product identification number (PIN) provided on the communication device; and
configuring and encoding one or more parameters for the subscription request for an internet browser channel service; and
displaying in response to the communicating step a pushed web content service icon associated with the internet browser channel on a display of the communication device, the pushed web content service icon changing appearance between a first state indicating availability of new web content pushed to the communication device through the server from the trusted third-party web content provider, and a second state indicating unavailability of new web content.

2. The method of claim 1, wherein the communicating comprises configuring one or more parameters for the subscription request for an internet browser channel service in a descriptor file.

3. The method of claim 1, wherein the communicating comprises encoding one or more parameters for the subscription request for an internet browser channel service in an HTTP request.

4. The method of claim 1, further comprising indicating that the pushed web content service icon is associated with the internet browser channel service.

5. The method of claim 1, wherein the displaying comprises receiving one or more alternative pushed web content service icons to indicate one or more alternative states.

6. The method of claim 1, wherein the displaying comprises anchoring the pushed web content service icon to a particular icon position of the display.

7. A communication device comprising a processor configured to:
communicate a subscription request for an internet browser channel service to a server, the server being in communication with a trusted third-party web content provider having pre-approved permission to push web content to the communication device through the internet browser channel, wherein the communicating comprises:
uniquely identifying the trusted third-party web content provider with an assignable unique internet browser channel identification;
uniquely identifying the communication device using at least one of an electronic serial number (ESN) or a product identification number (PIN) provided on the communication device; and configuring and encoding one or more parameters for the subscription request for an internet browser channel service; and display, in response to the communicating step, a pushed web content service icon associated with the internet browser channel on a display of the communication device, the pushed web content service icon changing appearance between a first state indicating availability of new web content pushed to the communication device through the server from the trusted third-party web content provider, and a second state indicating unavailability of new web content.

8. The device of claim 7, wherein the device is further adapted to communicate one or more parameters for the subscription request for an internet browser channel service in a descriptor file.

9. The system device of claim 7, wherein the device is further adapted to encode one or more parameters for the subscription request for an internet browser channel service in an HTTP request.

10. The device of claim 7, wherein the device is further adapted to define a unique pushed web content service icon associated with each internet browser channel service.

11. The device of claim 10, wherein the device is further adapted to display one or more alternative pushed web content service icons to indicate one or more alternative states.

12. The device of claim 11, wherein the device is further adapted to anchor a pushed web content service icon to a particular icon position in the display.

13. The device of claim 7, wherein the device is a smart phone.

14. A non-transitory computer readable medium containing instructions that cause a computing device to perform the method of:

communicating a subscription request for an internet browser channel service to a server, the server being in communication with a trusted third-party web content provider having pre-approved permission to push web content to the communication device through the internet browser channel, wherein the communicating comprises:

uniquely identifying the trusted third-party web content provider with an assignable unique internet browser channel identification;

uniquely identifying the communication device using at least one of an electronic serial number (ESN) or a product identification number (PIN) provided on the communication device; and configuring and encoding one or more parameters for the subscription request for an internet browser channel service; and displaying in response to the communicating step a pushed web content service icon associated with the internet browser channel on a display of the communication device, the pushed web content service icon changing appearance between a first state indicating availability of new web content pushed to the communication device through the server from the trusted third-party web content provider, and a second state indicating unavailability of new web content.

15. The non-transitory computer readable medium of claim 14, further containing instructions that cause a computing device to perform the method of defining a pushed web content icon associated with the pushed web content service.

\* \* \* \* \*